United States Patent [19]
Abe

[11] Patent Number: 5,609,064
[45] Date of Patent: Mar. 11, 1997

[54] SHIFTING APPARATUS FOR A BICYCLE

[75] Inventor: Takeo Abe, Sakai, Japan

[73] Assignee: Shimano, Inc., Osaka, Japan

[21] Appl. No.: 392,186

[22] Filed: Feb. 22, 1995

[30]   Foreign Application Priority Data

Feb. 23, 1994 [JP] Japan .................................. 6-025017

[51] Int. Cl.$^6$ .................................................. B62M 25/04
[52] U.S. Cl. ........................ 74/502.2; 74/489; 116/28.1
[58] Field of Search ........................ 74/475, 489, 502.2, 74/506; 116/28.1

[56]          References Cited

U.S. PATENT DOCUMENTS

| | | | |
|---|---|---|---|
| 3,524,979 | 8/1970 | Cohen. | |
| 4,270,481 | 6/1981 | Watarai | 116/28.1 |
| 4,325,267 | 4/1982 | Kojima | 74/489 |
| 4,343,201 | 8/1982 | Shimano | 74/475 |
| 4,454,784 | 6/1984 | Shimano | 74/475 |
| 5,095,768 | 3/1992 | Nagano | 74/475 |
| 5,325,735 | 7/1994 | Nagano | 74/502.2 |
| 5,400,675 | 3/1995 | Nagano | 74/502.2 |

FOREIGN PATENT DOCUMENTS

| | | | |
|---|---|---|---|
| 0552775 | 7/1993 | European Pat. Off.. | |
| 615896 | 9/1994 | European Pat. Off. | 74/489 |
| 2523066 | 3/1983 | France | 74/489 |
| 48-33173 | 10/1973 | Japan | 74/502.2 |
| 2-68289 | of 1990 | Japan. | |
| 2-106482 | 4/1990 | Japan | 74/502.2 |
| 93/19977 | 10/1993 | WIPO | 74/489 |

*Primary Examiner*—Charles A. Marmor
*Assistant Examiner*—Troy Grabow
*Attorney, Agent, or Firm*—James A. Deland

[57]          ABSTRACT

A shifting apparatus for a bicycle includes a fixed shaft, a takeup element rotatable about an axis of the fixed shaft to wind a control cable thereon, a shift lever for rotating the takeup element, and an indicator. The indicator includes a rotatable member interlocked to the takeup element to be rotatable about a rotational axis, and a fixed member for a speed stage of a change gear device based on a displacement relative to the rotatable member. The rotational axis of the rotatable member extends at an angle to the axis of the fixed shaft. At least a portion of the indicator is present on an extension of the axis of the fixed shaft.

17 Claims, 5 Drawing Sheets

SHIFTING APPARATUS FOR A BICYCLE

BACKGROUND OF THE INVENTION

1. Field of the Invention

The present invention relates to a shifting apparatus for shifting a front derailleur or rear derailleur of a bicycle. More particularly, the invention relates to an improvement in a shifting apparatus for a bicycle having an indicator for indicating speed stages of a derailleur.

2. Description of the Related Art

A conventional shifting apparatus of the type noted above is disclosed in Japanese Utility Model Publication Kokai No. 1990-68289, for example. As does the apparatus disclosed in this publication, many of the conventional shifting apparatus include a control cable takeup element rotatably mounted on a fixed shaft, and a speed indicator having a rotatable member also rotatably mounted on the fixed shaft. The rotatable member is rotatable with the takeup element to indicate speed stages of a derailleur.

U.S. Pat. No. 5,325,735 discloses another example of shifting apparatus which is mounted adjacent a handlebar. This apparatus includes a lever pivotable about a rotational axis of a takeup element, and an indicator rotatable about an axis disposed at 90 degrees to the above rotational axis. The takeup element and indicator are interlocked through crown gears.

U.S. Pat. No. 4,325,267 discloses a further example of shifting apparatus which is mounted on a handlebar. A lever usually is arranged pivotable about an axis extending perpendicular to the handlebar axis or a mounting plane of the shifting apparatus. In the apparatus disclosed in this patent, however, the lever is pivotable about an axis inclined with respect to the usual pivotal axis of the lever in order to allow a thumb and a finger of the cyclist's hand holding the handlebar to follow the lever with ease during a shifting operation.

In the first known example of shifting apparatus noted above, the takeup element and the rotatable member of the indicator are rotatably mounted on one fixed shaft, to realize a compact construction. However, when this shifting apparatus is attached to the handlebar with a shift lever disposed in a position easy to operate to rotate the takeup element, the operability of the lever is improved indeed but the indicator lies in a position difficult for the cyclist to see. There is room for improvement in this respect.

In the second known example noted above, the pivotal axis of the lever extends perpendicular to the rotational axis of the indicator. Thus, compared with the first example, the cyclist has a good view of the indicator with the operability of the lever maintained when effecting a shifting operation. However, the indicator disposed at 90 degrees to the handlebar axis (or the mounting plane of the apparatus) has a surface always extending parallel to the handlebar axis (or the mounting plane of the apparatus). When the shifting apparatus is mounted so that the shift lever lies in an optimal position for the cyclist, the indicator does not necessarily lie in an optimal position to be viewed by the cyclist. There is room for improvement in this respect. Further, since the rotational axis of the indicator is disposed at 90 degrees to the handlebar axis, an interlock mechanism (e.g. meshing of crown gears as disclosed) is provided between the takeup element and indicator. This results in an increased number of components and a complicated construction. Thus, there is room for improvement from the points of view of cost and assembling trouble.

In the third known example noted above, the shifting apparatus has a pivotal axis of the lever inclined at a predetermined angle to the handlebar. This apparatus may be set to an optimal condition for the cyclist to operate the shift lever. However, since the indicator is rotatable about the inclined pivotal axis of the shift lever, the display plane of the indicator in the above set condition does not necessarily lie in an optimal position to be viewed by the cyclist. There is room for improvement in this respect.

Besides the known examples described above, a further type of apparatus is known which includes an indicator, a takeup element and a shift lever formed separately from one another, the indicator being disposed in a position easy to see, with the shift lever disposed in a position easy to operate. However, naturally such an apparatus has a complicated construction. The shifting apparatus is costly as a whole.

SUMMARY OF THE INVENTION

The present invention has been made having regard to the disadvantages of the prior art noted above. The object of the present invention, therefore, is to provide a useful shifting apparatus having a compact overall construction, and allowing a shift lever to be disposed in a position easy to operate, and an indicator in a position easy to see.

The above object is fulfilled, according to the present invention, by a shifting apparatus for a bicycle comprising a fixed shaft, a takeup element rotatable about an axis of the fixed shaft to wind a control cable thereon, a shift lever for rotating the takeup element, and an indicator including a rotatable member interlocked to the takeup element to be rotatable about a rotational axis, and a fixed member for a speed stage of a change gear device based on a displacement relative to the rotatable member, wherein the rotational axis of the rotatable member extends at an angle to the axis of the fixed shaft, at least a portion of the indicator being present on an extension of the axis of the fixed shaft.

In the shifting apparatus for a bicycle according to the present invention, the axis of the shift lever and takeup element and the axis of the rotatable member of the indicator extend at an angle to each other. With this construction, an angle and direction of inclination between the two axes may be optimized while maintaining operability of the shift lever. This sets the indicator to an optimal angular position to present a display plane for view by the cyclist.

The above angle of inclination is set within a range to maintain at least a portion of the rotatable member of the indicator on an extension of the rotational axis of the takeup element rotatable by the shift lever. The present invention, therefore, does not require a complicated interlock mechanism between the takeup element and the rotatable member of the indicator, as required in the second known example noted above.

Thus, the shifting apparatus according to the present invention has a compact overall construction, and yet allows the shift lever to be disposed in a position easy to operate, and the indicator to face in a direction easy to see.

Other features and advantages of the present invention will be apparent from the following description of the preferred embodiments taken with reference to the drawings.

DETAILED DESCRIPTION OF THE PREFERRED EMBODIMENTS

Figure 1:
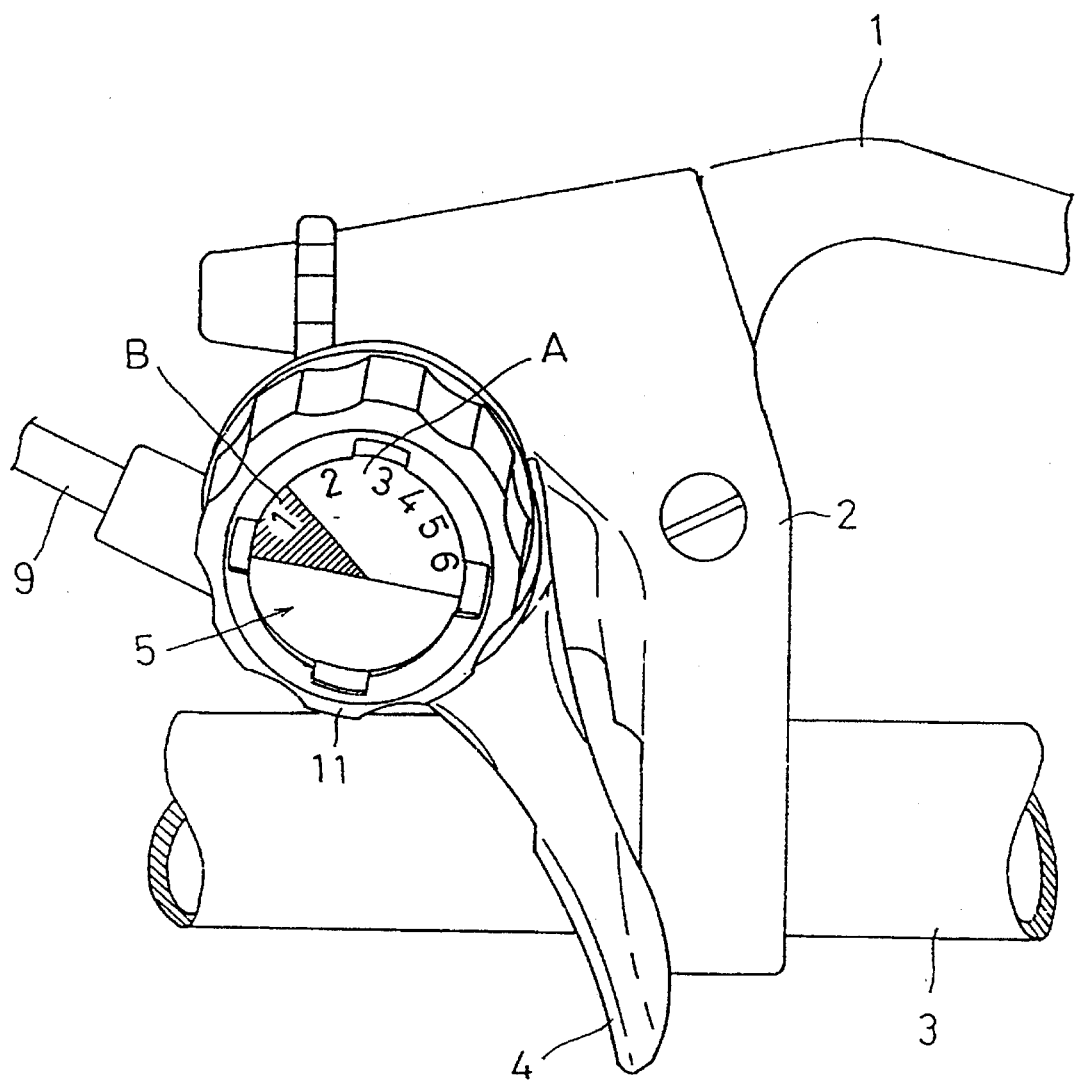
FIG. 1 is a plan view of a first embodiment of the present invention.

A first embodiment of the present invention will be described with reference to the drawings. FIG. 1 is a plan view showing a right brake lever 1 attached to a brake lever bracket 2 mounted on a handlebar 3. The brake lever bracket 2 supports a shifting apparatus including a shift lever 4 and an indicator 5.

Figure 2:
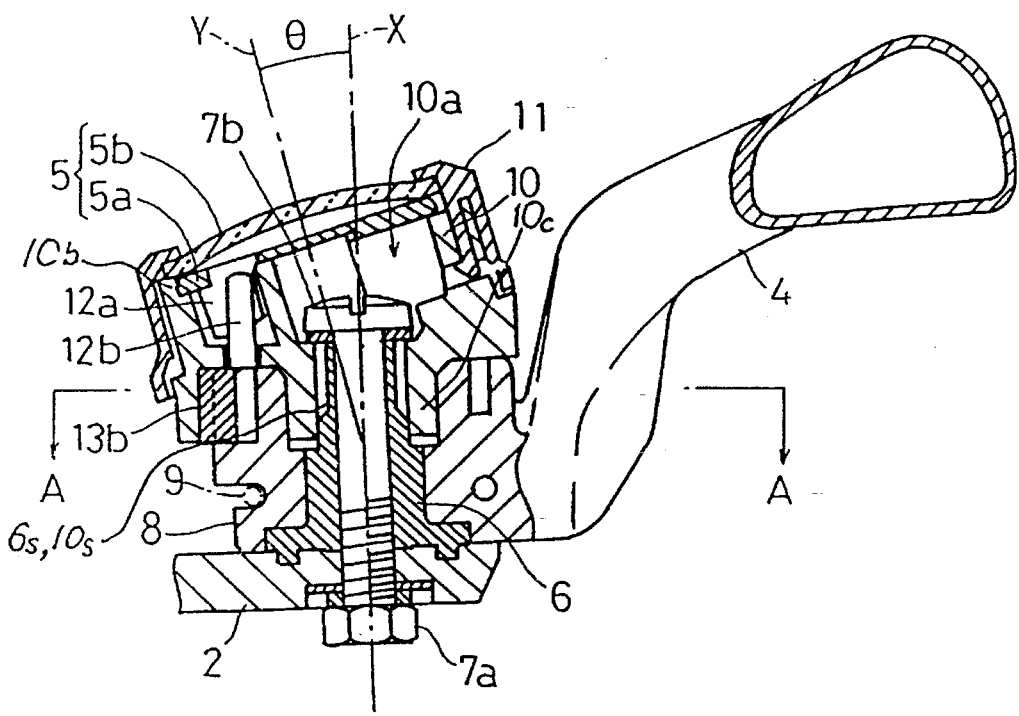
FIG. 2 is a view in vertical section of the first embodiment.

As shown in FIG. 2, a fixed shaft (or fixed shaft means) 6 defining a female screw centrally thereof is mounted on an upper surface of the brake lever bracket 2. The fixed shaft (or fixed shaft means) 6 is fixed to the bracket 2 by a bolt 7a, with an axis X of the fixed shaft 6 extending substantially perpendicular to the upper surface of the bracket 2. The fixed shaft 6 supports a takeup element 8 rotatably mounted on a lower portion thereof. The takeup element 8 is formed of the same material as and integral with a proximal end of the shift lever 4. The shift lever 4 is operable to rotate the takeup element 8 to wind or unwind a control cable 9 secured to the takeup element 8, thereby shifting a derailleur not shown.

The fixed shaft 6 supports a fixed frame (or fixed frame member) 10 mounted on an upper portion thereof and having a circular window 10a. The fixed frame 10 includes a boss 10c extending downward. The boss 10c defines inner splines 10s engaged with outer splines 6s formed on the fixed shaft 6. These splines 6s and 10s act as a first and a second engaging members of an engaging device. Thus, the fixed frame 10 is mounted on the fixed shaft 6 not to be rotatable relative thereto through the splines 6s and 10s, and fixed to the fixed shaft 6 by a bolt 7b.

The fixed frame 10 further includes an arc-shaped bulge 10d formed on a lower portion thereof and defining recesses 13c of a positioning mechanism described later.

The indicator 5 includes a rotatable member 5a mounted in the window 10a of the fixed frame 10. The rotatable member 5a is rotatable relative to the fixed frame 10, with a circular outer edge of the rotatable member 5a slidably fitted in a circular recess 10b defined in an inlet portion of the window 10a of the fixed frame 10. The indicator 5 further includes a fixed member 5b disposed above the rotatable member 5a and removably attached to the fixed frame 10 by a mounting cap 11.

As seen from FIG. 2, the circular window 10a has a centerline thereof slightly inclined with respect to a proximal portion of the fixed frame 10 splined to the fixed shaft 6. That is, the rotatable member 5a and fixed member 5b of the indicator 5 are mounted in the window 10a, such that the rotatable member 5a is disposed above and opposed to an end of the fixed shaft 6, and that the rotatable member 5a and fixed member 5b have a common axis Y inclined by an angle θ with respect to the axis X of the fixed shaft 6. As also seen from FIG. 2, the angle of inclination θ is not a large angle close to 90 degrees, but is such an angle that at least a portion of the indicator 5 lies on an extension of the axis X of the fixed shaft 6.

When the brake lever bracket 2 is attached to the handlebar 3, as seen from the plan view in FIG. 1, the rotatable member 5a and fixed member 5b of the indicator 5 are inclined not only downward in FIG. 1 with respect to a mounting plane of the brake lever bracket 2, but also leftward in FIG. 1. The indicator 5 is inclined leftward since this bracket 2 is designed for a right brake lever. The indicator 5 is inclined rightward in the case of a bracket designed for a left brake lever. In other words, the indicator 5 is inclined toward the eyes of the cyclist riding the bicycle.

The angle of inclination θ should be determined, taking account of a position and posture relative to the entire bicycle of the bracket or handlebar on which the shifting apparatus is mounted, and its size and direction may vary from bicycle to bicycle. This angle of inclination preferably is up to about 30 degrees where the shifting apparatus is mounted on a brake lever bracket for use on a bicycle having an ordinary horizontal handlebar.

The fixed member 5b of the indicator 5 is formed of a transparent plate, and has speed marks A printed or stamped thereon which correspond in number to speed stages provided by the derailleur. On the other hand, the rotatable member 5a of the indicator 5 has a pointer B provided thereon to enable, based on a position of the pointer B resulting from a rotation of the rotatable member 5a, a visual observation of a speed stage provided by the derailleur. The rotatable member 5a has engageable members 12a in the form of two plates integral with and extending from a lower surface of the rotatable member 5a. The takeup element 8 has an engaging pin 12b integral with and extending from an upper surface thereof. The engaging pin 12b is interposed between the two engageable members 12a. When the takeup element 8 is rotated about the axis X, the engagement between the engaging pin 12b and engageable members 12a causes the rotatable member 5a to rotate about the axis Y though the axis Y is inclined with respect to the axis X of the takeup element 8, thereby enabling a visual observation of a speed stage provided by the derailleur.

Alternatively, the engaging pin 12b may be formed integral with the rotatable member 5a of the indicator 5, and the engageable members 12a formed integral with the takeup element 8.

Figure 3:
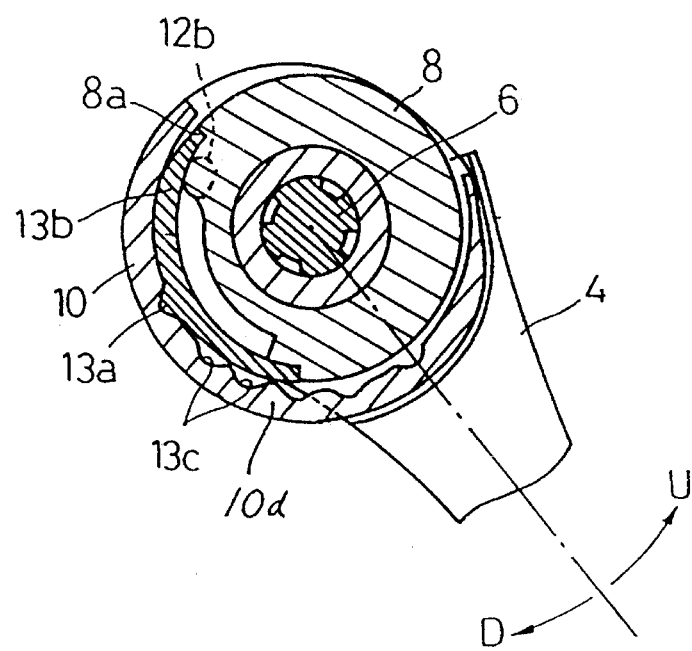
FIG. 3 is a section taken on line A—A of FIG. 2.

As seen from FIGS. 2 and 3, the takeup element 8 has an outer periphery partly cut out as at 8a, and an elastically deformable positioning member 13b having a projection 13a is mounted in the cutout 8a. The arc-shaped bulge 10d of the fixed frame 10 opposed to the positioning member 13b defines recesses 13c corresponding in number to the speed stages of the derailleur for receiving the projection 13a. The projection 13a and recesses 13c constitute a positioning mechanism 13 provided between the takeup element 8 and fixed frame 10. When the takeup element 8 is rotated to effect a shifting operation, the projection 13a moves round with the rotation of the takeup element 8. At this time, the projection is elastically deformed to enter one of the recesses 13c to elastically retain the takeup element 8 in an angular position.

Operation of the first embodiment will be described next. When the shift lever 4 is swung in a direction U, the positioning member 13b of the positioning mechanism 13 rotates with the takeup element 8. The projection 13a moves out of one of the recesses 13c, and the takeup element 8 rotates in a winding direction from a previous angular position to wind the control cable 9 thereon. When the shift lever 4 reaches a selected shift position, the projection 13a moves into one of the recesses 13c corresponding to the selected shift position, whereby the positioning mechanism 13 retains the takeup element 8 in a new angular position.

Conversely, when the shift lever 4 is swung in a direction D, the projection 13a of the positioning mechanism 13 moves out of one of the recesses 13c as above, and the takeup element 8 rotates in an unwinding direction from a previous angular position. The control cable 9 is unwound from the takeup element 8 under the force of a return spring provided for the derailleur. When the shift lever 4 reaches a selected shift position, the projection 13a moves into a different recess 13c, whereby the positioning mechanism 13 retains the takeup element 8 in a new angular position.

Shifting operations are carried out as described above. Since the common axis Y of the rotatable member 5a and fixed member 5b of the indicator 5 is inclined by angle θ with respect to the axis X of rotation of the takeup element 8, the speed stages indicated by the indicator 5 are easy to see while the shift lever 4 is readily operable to effect the shifting operations. The conventional shifting apparatus have the inconvenience that the indicator 5 inevitably faces in a direction difficult to see for the cyclist even if the shift lever 4 is disposed in an optimal position. However, in the shifting apparatus according to the present invention, the indicator 5 may be oriented in a direction to facilitate its view by the cyclist while the shift lever 4 is attached to a position easy to operate, which is achieved by appropriately selecting the size and direction of inclination θ of the axis Y.

A second embodiment of the present invention will be described next. In the following description, like reference numerals are used to identify like parts in the first embodiment and will not be described again, wherever possible, to avoid repetition.

Figure 4:
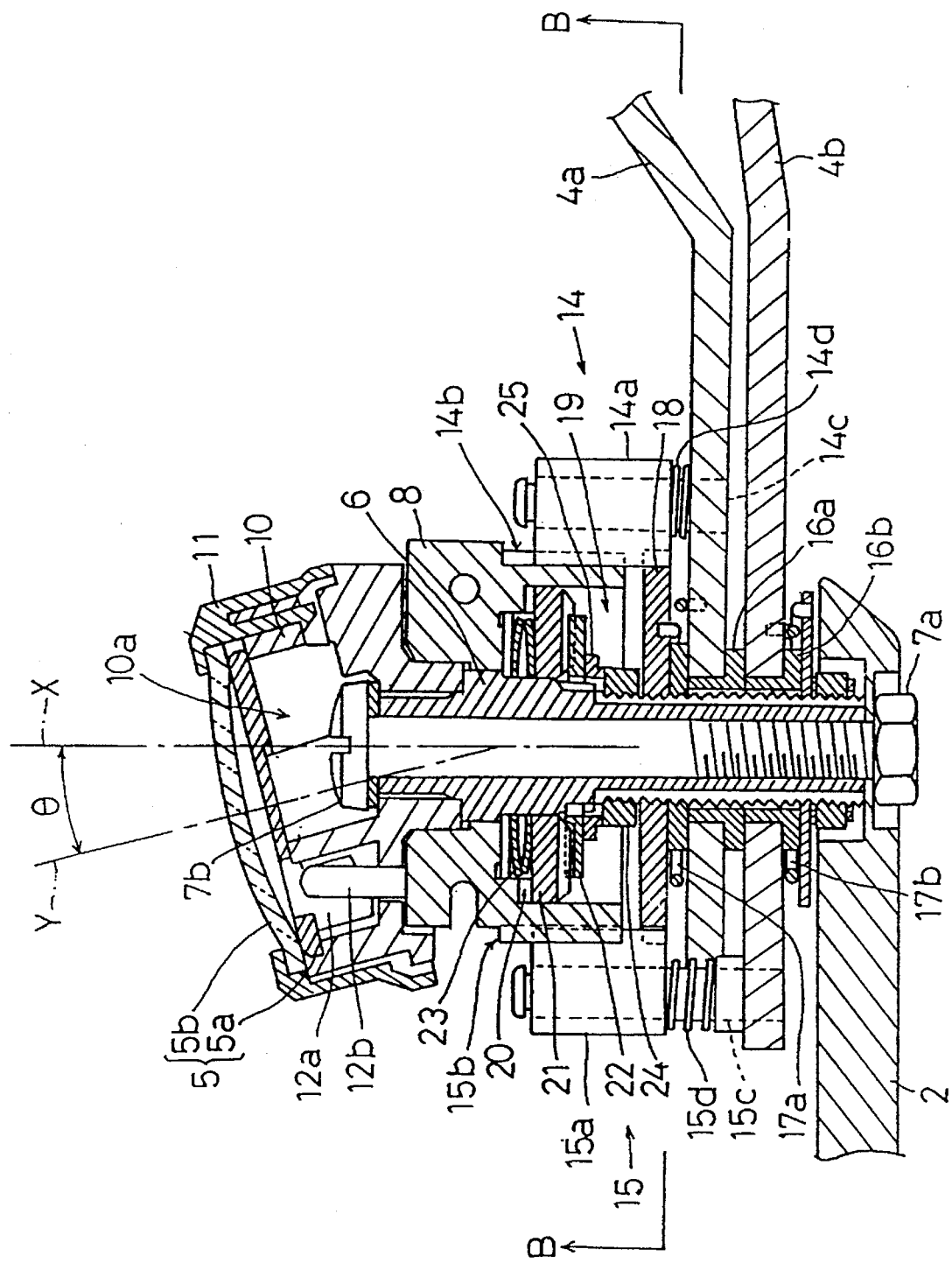
FIG. 4 is a view in vertical section of a second embodiment.

As seen from FIG. 4, in the second embodiment also, a fixed shaft (or fixed shaft means) 6 is disposed on an upper surface of a brake lever bracket 2, and fixed to the bracket 2 by a belt 7a, with the axis X of the fixed shaft 6 extending substantially perpendicular to the upper surface of the bracket 2. As in the first embodiment, a takeup element 8 is rotatably mounted in the fixed shaft 6. However, this takeup element 8 is mounted on an upper portion of the fixed shaft 6. The fixed shaft 6 further supports two shift levers 4a and 4b, as distinct from the first embodiment, which are pivotably attached thereto between the takeup element 8 and bracket 2. The first shift lever 4a is interlocked to the takeup element 8 through a first ratchet mechanism 14 having a first feed pawl 14a. The second shift lever 4b is interlocked to the takeup element 8 through a second ratchet mechanism 15 having a second feed pawl 15a.

Figure 5:
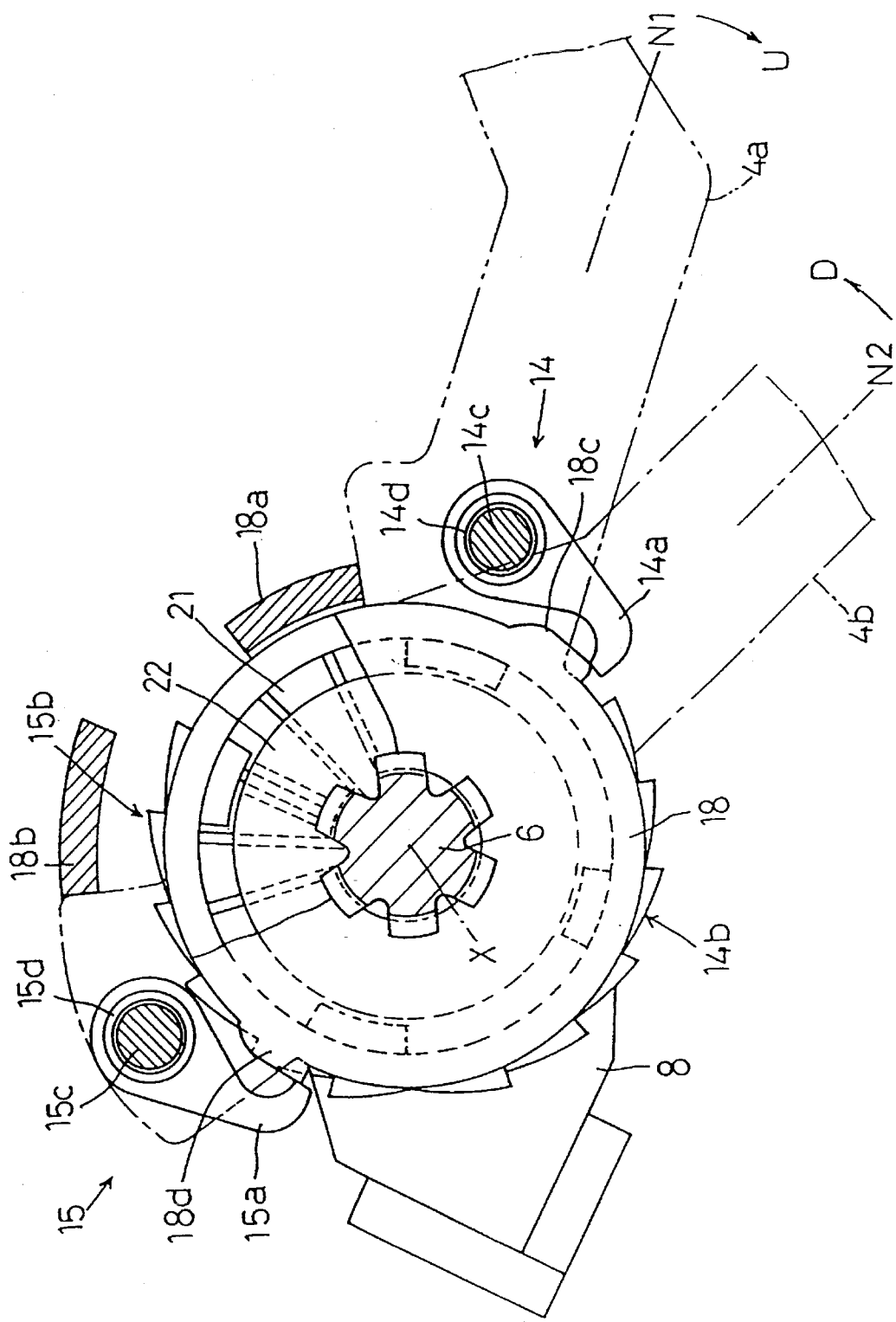
FIG. 5 is a section taken on line B—B of FIG. 4.

The two shift levers 4a and 4b are pivotably mounted on the fixed shaft 6 through bushes 16a and 16b, and biased in opposite directions by return springs 17a and 17b, respectively. A cam 18 is fixed to the fixed shaft 6 between the shift levers 4a, 4b and the takeup element 8. As shown in FIG. 5, a first stopper 18a and a second stopper 18b extend from the cam 18. The first shift lever 4a pivots under the biasing force of the return spring 17a into contact with the first stopper 18a to be retained in original position N1. The second shift lever 4b pivots under the biasing force of the return spring 17b into contact with the second stopper 18b to be retained in original position N2.

As shown in FIG. 5, the takeup element 8 has a pair of ratchets 14b and 15b formed peripherally thereof and in opposite regions across the axis X of the fixed shaft 6. The first ratchet mechanism 14 consists of the first ratchet 14b and the first feed pawl 14a pivotably attached to a first pawl axis 14c extending from the first shift lever 4a. Similarly, the second ratchet mechanism 15 consists of the second ratchet 15b and the second feed pawl 15a pivotably attached to a second pawl axis 15c extending from the second shift lever 4b.

When the first shift lever 4a is in the original position N1, a tip end of the first feed pawl 14a of the first ratchet mechanism 14 rides on a first cam portion 18c of the cam 18. The first feed pawl 14a is pushed outward by the first cam portion 18c to be disengaged from the first ratchet 14b, to enable the second shift lever 4b to rotate the takeup element 8. When the first shift lever 4a is swung in a direction U from the original position N1, the first feed pawl 14a departs from the first cam portion 18c, and pivots toward the first ratchet 14b under the biasing force of a first pawl spring 14d. As a result, the first feed pawl 14a engages one of ratchet teeth of the first ratchet 14b, thereby interlocking the first shift lever 4a and takeup element 8 to be movable together. When the first shift lever 4a is swung from a certain shift position to the original position N1, the first feed pawl 14a is automatically disengaged from the first ratchet 14b by pushing action due to a configuration of the ratchet teeth.

In sum, when the first shift lever 4a pivots from the original position N1 to a shift position, the first ratchet mechanism 14, through the engagement between the first feed pawl 14a and first ratchet 14b, transmits the torque to the takeup element 8 to enable winding of the control cable 9. When the first shift lever 4a pivots from a shift position to the original position N1, the first feed pawl 14a is disengaged from the first ratchet 14b. The first shift lever 4a alone automatically returns to the original position N1 by the action of the return spring 17a, leaving the takeup element 8 in a selected angular position.

Similarly, when the second shift lever 4b is in the original position N2, a tip end of the second feed pawl 15a of the second ratchet mechanism 15 rides on a second cam portion 18d of the cam 18. The second feed pawl 15a is pushed outward by the second cam portion 18d to be disengaged from the second ratchet 15b, to enable the first shift lever 4a to rotate the takeup element 8. When the second shift lever 4b is swung in a direction D from the original position N2, the second feed pawl 15a departs from the second cam portion 18d, and pivots toward the second ratchet 15b under the biasing force of a second pawl spring 15d. As a result, the second feed pawl 15a engages one of ratchet teeth of the second ratchet 15b, thereby interlocking the second shift lever 4b and takeup element 8 to be movable together. When the second shift lever 4b is swung from a certain shift position to the original position N2, the second feed pawl 15a is automatically disengaged from the second ratchet 15b by pushing action due to a configuration of the ratchet teeth.

In sum, when the second shift lever 4b pivots from the original position N2 to a shift position, the second ratchet mechanism 15, through the engagement between the second feed pawl 15a and second ratchet 15b, transmits the torque to the takeup element 8 to enable unwinding of the control cable 9. When the second shift lever 4b pivots from a shift position to the original position N2, the second feed pawl 15a is disengaged from the second ratchet 15b. The second shift lever 4b alone automatically returns to the original position N2 by the action of the return spring 17b, leaving the takeup element 8 in a selected angular position.

As in the first embodiment, the fixed shaft 6 supports a fixed frame 10 fixed to an upper portion thereof by a bolt 7b and having a circular window 10a. A rotatable member 5a forming part of an indicator 5 is relatively rotatably mounted in the window 10a of the fixed frame 10. The indicator 5 further includes a fixed member 5b disposed above the rotatable member 5a and removably attached to the fixed frame 10 by a cap 11. As in the first embodiment, the rotatable member 5a and fixed member 5b of the indicator 5 are mounted in the window 10a, such that the rotatable member 5a and fixed member 5b arranged above the fixed shaft 6 and on the axis X of the fixed shaft 6 to have a common axis Y inclined by an angle θ with respect to the axis X of the fixed shaft 6.

As in the first embodiment, the fixed member 5b of the indicator 5 is formed of a transparent plate having speed marks A. The rotatable member 5a has a pointer B. The rotatable member 5a has engageable members 12a, while the takeup element 8 has an engaging pin 12b. When the takeup element 8 is rotated about the axis X, the engagement between the engaging pin 12b and engageable members 12a causes the rotatable member 5a to rotate about the axis Y, thereby enabling a visual observation of a speed stage provided by the derailleur.

The takeup element 8 is hollowed out to define a mounting recess 19 therein, and a positioning mechanism 20 is disposed therein. The positioning mechanism 20 includes a pair of positioning plates 21 and 22 mounted on the fixed shaft 6, and a pair of belleville springs 23 mounted on the fixed shaft 6 between the positioning plate 21 and takeup element 8.

Figure 6:
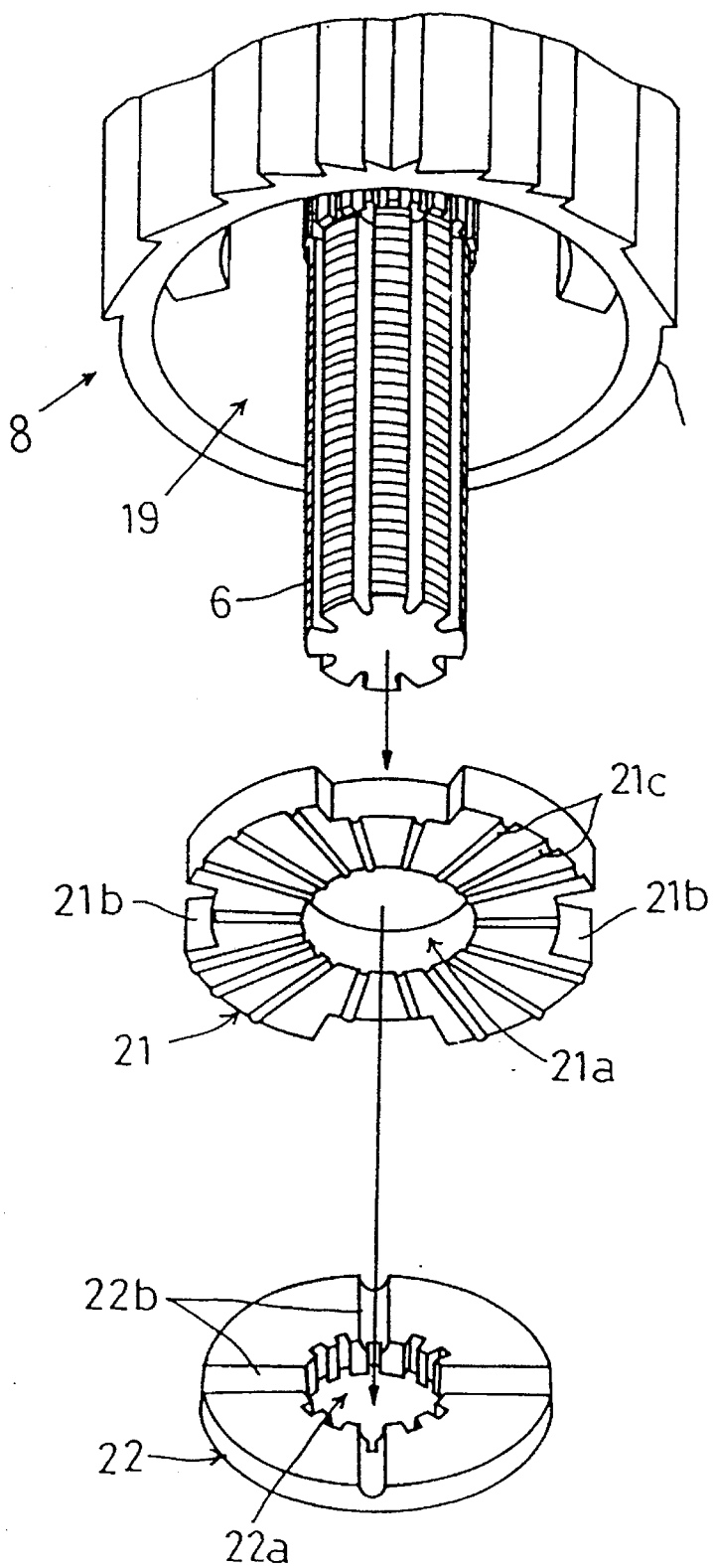
FIG. 6 is an exploded perspective view of a principal portion of the second embodiment.

As shown in FIG. 6, one of the positioning plates 21 includes a circular mounting bore 21a defined centrally thereof, and spline projections 21b arranged peripherally. The positioning plate 21 is mounted on the fixed shaft 6 to be rotatable as well as slidable along the axis X thereof, with the spline projections 21b in spline engagement with the recess 19 of the takeup element 8 only to be rotatable therewith. Thus, the positioning plate 21 is slidable along the axis X relative to both the fixed shaft 6 and takeup element 8. When the takeup element 8 rotates, the positioning plate 21 rotates with the takeup element 8.

The other positioning plate 22 is mounted on the fixed shaft 6 in spline engagement therewith through a splined bore 22a, and supported in place by a clamp nut 24 through a spacer 25. Thus, the positioning plate 22 is neither rotatable nor slidable relative to the fixed shaft 6.

The belleville springs 23 biases one positioning plate 21 to slide toward the other positioning plate 22. As clearly shown in FIG. 6, the positioning plate 21 define a plurality of ridges 21c engageable with a plurality of grooves 22b formed in the positioning plate 22. When the positioning plate 21 engages the positioning plate 22, the positioning plate 22, through the positioning plate 21, locks the takeup element 8 against rotation to retain the latter in a selected position. When the takeup element 8 is rotated by a force exceeding a predetermined force provided by the belleville springs 23, the positioning plate 21 slides away from the positioning plate 22 against the biasing force of the belleville springs 23. Consequently, the ridges 21c of the positioning plate 21 become disengaged from the grooves 22b of the positioning plate 22 to allow rotation of the takeup element 8.

In sum, this positioning mechanism 20 allows the takeup element 8 to be rotated by a force exceeding a predetermined value. When the positioning plate 21 engages the other positioning plate 22, the positioning mechanism 20 retains the takeup element 8 in a selected angular position against the force of the return spring of the derailleur applied through the control cable 9.

Operation of the second embodiment will be described next. When the first shift lever 4a is swung in the direction U from the original position N1, the shift lever 4a causes rotation of the takeup element 8 through the first ratchet mechanism 14. At the same time, the positioning mechanism 20 is canceled. As a result, the takeup element 8 rotates in a winding direction from a previous angular position to wind the control cable 9 thereon. When the first shift lever 4a is released after reaching a selected shift position, the positioning plate 21 is switched from disengaged state to engaged state whereby the positioning mechanism 20 retains the takeup element 8 in a new angular position. The first shift lever 4a automatically returns to the original position N1 under the force of return spring 17a.

When the second shift lever 4b is swung in the direction D from the original position N2, the shift lever 4b causes rotation of the takeup element 8 through the second ratchet mechanism 15. At the same time, the positioning mechanism 20 is canceled. As a result, the takeup element 8 rotates in an unwinding direction from a previous angular position to unwind the control cable 9 therefrom. When the second shift lever 4b is released after reaching a selected shift position, the positioning plate 21 is switched from disengaged state to engaged state whereby the positioning mechanism 20 retains the takeup element 8 in a new angular position. The second shift lever 4b automatically returns to the original position N2 under the force of return spring 17b.

In the second embodiment also, the common axis Y of the rotatable member 5a and fixed member 5b of the indicator 5 is inclined by angle θ with respect to the axis X of rotation of the takeup element 8. Thus, as in the first embodiment, the speed stages indicated by the indicator 5 are easy to see while the first and second shift levers 4a and 4b are readily operable to effect the shifting operations.

In the foregoing embodiments, the shifting apparatus is attached to the handlebar 3 through the brake lever bracket 2. However, the shifting apparatus may be attached directly to the handlebar 3.

Further, the rotatable member 5a of the indicator 5 has the pointer B, while the fixed member 5b has the speed marks A. Conversely, the rotatable member 5a may have the speed marks A, and the fixed member 5b the pointer B.

The first embodiment includes the positioning mechanism 13, and the second embodiment the positioning mechanism 20, for retaining the takeup element 8 in selected angular positions. These positioning mechanisms may be replaced by a construction including balls, springs for biasing the balls, and recesses for receiving the balls, attached to or formed in appropriate components.

What is claimed is:

1. A shifting apparatus for a bicycle comprising:
    fixed shaft means extending along a first axis;
    a takeup element coaxially rotatable with said first axis of said fixed shaft means to wind a control cable thereon;
    shift lever means for rotating said takeup element; and
    an indicator including a rotatable member interlocked to said takeup element to be coaxially rotatable with a second axis, and a fixed member for indicating a speed stage of a change gear device based on a displacement relative to said rotatable member, wherein said second axis is inclined relative to said first axis, at least a portion of said indicator being present on an extension of said first axis.

2. A shifting apparatus as defined in claim 1, further comprising fixed frame means for supporting said indicator, said fixed frame means being relatively unrotatably mounted on said fixed shaft means through meshing means, and an index mechanism for retaining said takeup element in an angular position set by said shift lever means.

3. A shifting apparatus as defined in claim 2, wherein said index mechanism is disposed between said takeup element and said fixed frame means.

4. A shifting apparatus as defined in claim 2, wherein said index mechanism is disposed between said fixed shaft means and said takeup element.

5. A shifting apparatus as defined in claim 2, further comprising connecting means for operatively interconnecting said takeup element and said rotatable member, said connecting means including an engaging member provided on said takeup element, and an engageable member provided on said rotatable member.

6. A shifting apparatus as defined in claim 5, wherein said engaging member is a pin-shaped member formed on said takeup element, and said engageable member is a pair of projections formed integral with said rotatable member and opposed to each other with said pin-shaped member disposed in between.

7. A shifting apparatus as defined in claim 2, wherein said rotatable member has a circular outer edge, and said fixed frame means has a circular recess for slidably receiving said outer edge of said rotatable member.

8. A shifting apparatus as defined in claim 2, wherein said meshing means includes a first meshing member formed in a boss extending from one end of said fixed frame means, and a second meshing member formed on an end portion of said fixed shaft means and engaged with said first meshing member.

9. A shifting apparatus as defined in claim 8, wherein said takeup element has a recess formed in an end portion thereof for slidably receiving an outer periphery of said boss.

10. A shifting apparatus as defined in claim 8, wherein said first meshing member is inner splines formed in an inner peripheral surface of said boss, and said second meshing member is outer splines formed on said end portion.

11. A shifting apparatus as defined in claim 9, wherein said one end of said fixed frame means has an arcuate section, with a projection formed on said one end to form part of said index mechanism.

12. A shifting apparatus as defined in claim 1, wherein said shift lever means is formed integral with said takeup element.

13. A shifting apparatus as defined in claim 1, wherein said shift lever means includes a first shift lever and a second shift lever interlocked to said takeup element and automatically movable back to original positions, respectively, said first shift lever being operable to rotate said takeup element in one direction through a first ratchet mechanism, said second shift lever being operable to rotate said takeup element in the other direction through a second ratchet mechanism.

14. A shifting apparatus as defined in claim 1, wherein said angle is up to 30 degrees.

15. A shifting apparatus as defined in claim 1 wherein said rotatable member is a separate member from said takeup element and interlocked to said takeup element through a meshing means.

16. A shifting apparatus for a bicycle comprising:

fixed shaft means;

a takeup element rotatable about a first axis of said fixed shaft means to wind a control cable thereon;

shift lever means for rotating said takeup element;

an indicator including a rotatable member interlocked to said takeup element to be rotatable about a second axis, and a fixed member for indicating a speed stage of a change gear device based on a displacement relative to said rotatable member, wherein said second axis extends at an angle relative to said first axis, at least a portion of said indicator being present on an extension of said first axis;

fixed frame means for supporting said indicator;

meshing means for interconnecting said fixed frame means and said fixed shaft means to be unrotatable relative to each other, said meshing means including a first meshing member formed in a boss extending from one end of said fixed frame means, and a second meshing member formed on an end portion of said fixed shaft means and engaged with said engaging member; and an index mechanism for retaining said takeup element in an angular position set by said shift lever means.

17. A shifting apparatus as defined in claim 16, wherein said angle is up to 30 degrees.

* * * * *